(12) United States Patent
Martinez et al.

(10) Patent No.: US 7,574,463 B2
(45) Date of Patent: Aug. 11, 2009

(54) DETECTING GRANULAR DATA STORE CHANGES

(75) Inventors: Andrea C. Martinez, Poughkeepsie, NY (US); Charles Matula, Poughkeepsie, NY (US); David Henry Starke, Poughkeepsie, NY (US); Gregory Richard Edward Wiley, Wappingers Falls, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/129,772

(22) Filed: May 30, 2008

(65) Prior Publication Data

US 2008/0235269 A1    Sep. 25, 2008

Related U.S. Application Data

(63) Continuation of application No. 11/316,164, filed on Dec. 21, 2005, now Pat. No. 7,409,413.

(51) Int. Cl.
G06F 17/30    (2006.01)

(52) U.S. Cl. .................... 707/204; 709/220

(58) Field of Classification Search .............. 707/204, 707/2, 203; 709/220
See application file for complete search history.

(56) References Cited

U.S. PATENT DOCUMENTS

| | | | |
|---|---|---|---|
| 6,397,308 B1 | 5/2002 | Ofek et al. | |
| 6,564,219 B1 | 5/2003 | Lee et al. | |
| 6,820,095 B1 | 11/2004 | Yeung et al. | |
| 6,957,234 B1 | 10/2005 | Steinbach | |
| 2002/0165724 A1 | 11/2002 | Blankesteijn | |
| 2003/0182330 A1 | 9/2003 | Manley et al. | |
| 2004/0098425 A1 | 5/2004 | Wiss et al. | |
| 2004/0236763 A1 | 11/2004 | Krishnamoorthy et al. | |
| 2005/0055384 A1 | 3/2005 | Ganesh et al. | |
| 2005/0149493 A1* | 7/2005 | Yamashita et al. | 707/2 |
| 2005/0251540 A1* | 11/2005 | Sim-Tang | 707/202 |

\* cited by examiner

*Primary Examiner*—Vincent F Boccio
(74) *Attorney, Agent, or Firm*—Schmeiser, Olsen & Watts; John R. Pivnichny

(57) ABSTRACT

A system and program product for detecting granular data store changes in a computing environment. Data values stored in a first relational database are changed. Each data value is stored in a row and a column of the first relational database. Rows (i.e., changed rows) including the changed data values are identified. Changed rows are propagated to a second relational database. Columns including the changed data values are identified in the second relational database. The types of changes associated with the changed data values are identified. Filters optionally filter out one or more of the changed data values from further processing. At least one data value of the changed data values, along with their types of changes, are transformed into a language neutral format included in packaged data to be sent in response to a client requesting the at least one data value.

8 Claims, 9 Drawing Sheets

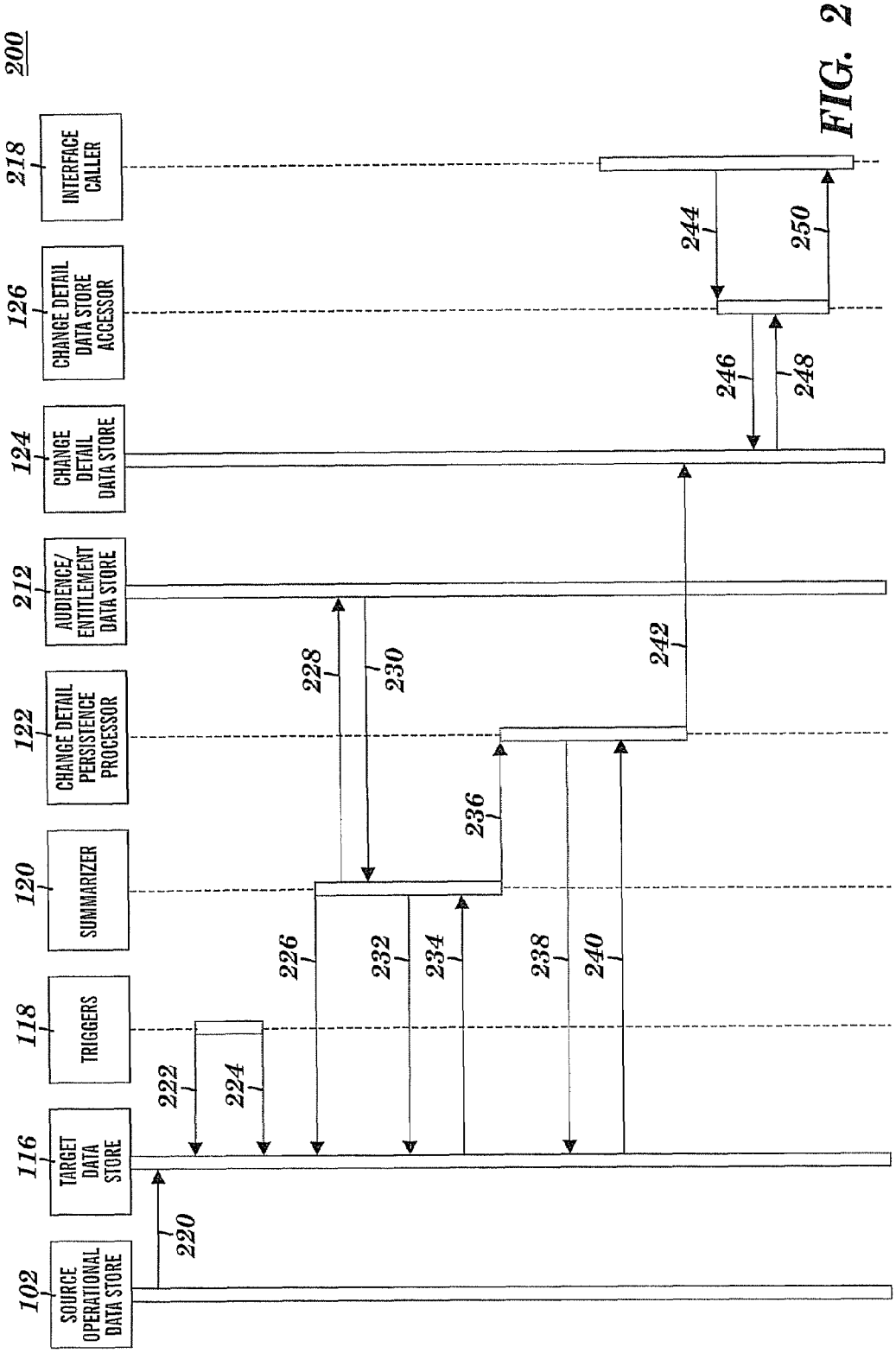

330

| ID | OrderNumber | CustomerID | EntryDate | PurchaseOrderNumber | Comments | UpdateTimeStamp |
|---|---|---|---|---|---|---|
| 100000 | IBM1000000 | 9900000069 | 01/12/2004 | ACMEservers121 | eServers order | 2004-01-12 16:04:23.009876 |
| 100001 | IBM2000012 | 9900000069 | 01/13/2004 | ACMEsoftwre224 | Software order | 2004-01-13 10:45:52.345722 |
| 100002 | IBM3032400 | 9836000034 | 01/13/2004 | FOO0010498 | RSS system order | 2004-01-13 10:54:23.038726 |
| 100003 | IBM8262393 | 3480023435 | 01/14/2004 | ACGM011446 | eServers order | 2004-01-12 16:04:23.009876 |

| ID | CustomerNumber | FirstName | MiddleName | LastName |
|---|---|---|---|---|
| 9900000069 | ACME222052 | Anthony | A. | Acme |
| 9836000034 | FOOCorp231 | Fred | Forsythe | Feester |
| 3480023435 | ACGenMo909 | Lawrence | Lilliputin | Liverpool |

| ID | LineItemNumber | OrderID | ProductName | Quantity | Price |
|---|---|---|---|---|---|
| 100000 | 1000000001 | 100000 | xSeries 5474 | 25 | 652.38 |
| 100001 | 1000000002 | 100000 | xSeries 9436-09 | 12 | 596.24 |
| 100002 | 1000000003 | 100001 | DBMS | 2 | 1200.36 |
| 100003 | 1000000004 | 100002 | LX cashier | 5 | 6502.98 |
| 100004 | 1000000005 | 100003 | zSeries 3609 | 1 | 60642.83 |

*FIG. 3D*

```
<purchaseOrder changeIndicator="I">
<customerPurchaseOrderNumber ChangeIndicator="I">ACMEservers121</customerPurchaseOrderNumber>
<customerNumber changeIndicator="I">ACME222052</customerNumber>
<order changeIndicator="I">
    <orderNumber changeIndicator="I">IBM1000000</orderNumber>
    <entryDate changeIndicator="I">01/12/2004</entryDate>
    <comments changeIndicator="I">eServers order</comments>
    <customer changeIndicator="I">
        <customerNumber changeIndicator="I">ACME222052</customerNumber>
        <firstName changeIndicator="I">Anthony</firstName>
        <middleName changeIndicator="I">A.</middleName>
        <lastName changeIndicator="I",>Acme</lastName>
    </customer>
    <lineItems>
        <lineItem changeIndicator="I">
            <lineItemNumber changeIndicator="I">1000000001</lineItemNumber>
            <productName changeIndicator="I">xSeries 5474</productName>
            <quantity changeIndicator="I">25</quantity>
            <price changeIndicator="I">652.38</price>
        </lineItem>
        <lineItem changeIndicator="I">
            <lineItemNumber changeIndicator="I">1000000002</lineItemNumber>
            <productName changeIndicator="I">xSeries 9436-09</productName>
            <quantity changeIndicator="I">12</quantity>
            <price changeIndicator="I">596.24</price>
        </lineItem>
    </lineItems>
</order>
</purchaseOrder>
```

```
<purchaseOrder changeIndicator="U">
  <customerPurchaseOrderNumber changeIndicator="N">ACMEservers121</customerPurchaseOrderNumber>
  <customerNumber changeIndicator="N">ACME222052</customerNumber>
  <order changeIndicator="N">
    <orderNumber changeIndicator="N">IBM1000000</orderNumber>
    <entryDate changeIndicator="N">01/12/2004</entryDate>
    <comments changeIndicator="N">eServers order</comments>
    <customer changeIndicator="N">
      <customerNumber changeIndicator="N">ACME222052</customerNumber>
      <firstName changeIndicator="N">Anthony</firstName>
      <middleName changeIndicator="N">A.</middleName>
      <lastName changeIndicator="N">Acme</lastName>
    </customer>
    <lineItems>
      <lineItem changeIndicator="U">
        <lineItemNumber changeIndicator="N">1000000001</lineItemNumber>
        <productName changeIndicator="N">xSeries 5474</productName>
        <quantity changeIndicator="U">100</quantity>
        <price changeIndicator="U">600.00</price>
      </lineItem>
      <lineItem changeIndicator="N">
        <lineItemNumber changeIndicator="N">1000000002</lineItemNumber>
        <productName changeIndicator="N">xSeries 9436-09</productName>
        <quantity changeIndicator="N">12</quantity>
        <price changeIndicator="N">596.24</price>
      </lineItem>
    </lineItems>
  </order>
</purchaseOrder>
```

<purchaseOrder changeIndicator="U">
    <customerPurchaseOrderNumber changeIndicator="N">ACMEservers121</customerPurchaseOrderNumber>
    <customerNumber changeIndicator="N">ACME222052</customerNumber>
    <order changeIndicator="N">
        <orderNumber changeIndicator="N">IBM1000000</orderNumber>
        <entryDate changeIndicator="N">01/12/2004</entryDate>
        <comments changeIndicator="N">eServers order</comments>
        <customer changeIndicator="N">
            <customerNumber changeIndicator="N">ACME222052</customerNumber>
            <firstName changeIndicator="N">Anthony</firstName>
            <middleName changeIndicator="N">A.</middleName>
            <lastName changeIndicator="N">Acme</lastName>
        </customer>
        <lineItems>
            <lineItem changeIndicator="U">
                <lineItemNumber changeIndicator="N">1000000001</lineItemNumber>
                <productName changeIndicator="N">xSeries 5474</productName>
                <quantity changeIndicator="U">100</quantity>
                <price changeIndicator="U">600.00</price>
            </lineItem>
            <lineItem changeIndicator="N">
                <lineItemNumber changeIndicator="N">1000000002</lineItemNumber>
                <productName changeIndicator="N">xSeries 9436-09</productName>
                <quantity changeIndicator="N">12</quantity>
                <price changeIndicator="N">596.24</price>
            </lineItem>
        </lineItems>
    </order>
</purchaseOrder>
```

*FIG. 5B*

```xml
<purchaseOrder changeIndicator="U">
  <customerPurchaseOrderNumber changeIndicator="N">ACMEservers121</customerPurchaseOrderNumber>
  <customerNumber changeIndicator="N">ACME222052</customerNumber>
  <order changeIndicator="N">
    <orderNumber changeIndicator="N">IBM1000000</orderNumber>
    <entryDate changeIndicator="N">01/12/2004</entryDate>
    <comments changeIndicator="N">eServers order</comments>
    <customer changeIndicator="N">
      <customerNumber changeIndicator="N">ACME222052</customerNumber>
      <firstName changeIndicator="N">Anthony</firstName>
      <middleName changeIndicator="N">A.</middleName>
      <lastName changeIndicator="N">Acme</lastName>
    </customer>
    <lineItems>
      <lineItem changeIndicator="N">
        <lineItemNumber changeIndicator="N">1000000001</lineItemNumber>
        <productName changeIndicator="N">xSeries 5474</productName>
        <quantity changeIndicator="U" updateTimeStamp="2004-01-15 21:23:02.392749">100</quantity>
        <price changeIndicator="U" updateTimeStamp="2004-01-15 21:23:02.983289">600.00</price>
      </lineItem>
      <lineItem changeIndicator="N">
        <lineItemNumber changeIndicator="N">1000000002</lineItemNumber>
        <productName changeIndicator="N">xSeries 9436-09</productName>
        <quantity changeIndicator="N">12</quantity>
        <price changeIndicator="N">596.24</price>
      </lineItem>
    </lineItems>
  </order>
</purchaseOrder>
```

DETECTING GRANULAR DATA STORE CHANGES

This application is a continuation application claiming priority to Ser. No. 11/316,164, filed Dec. 21, 2005 now U.S. Pat. No. 7,409,413.

BACKGROUND OF THE INVENTION

1. Technical Field

The present invention relates to a method and system for detecting granular data store changes, and more particularly to a technique for detecting data store changes at a column level within a row, and packaging the data store changes in a language neutral format.

2. Related Art

Conventional techniques that detect changes in an operational data store (ODS) are limited to changes at the level of a database table or row. Implementing a data warehouse as an alternative technique for keeping track of data changes is not always feasible. Migrating an existing ODS solution to a data warehouse architecture requires a significant amount of financial investment and analysis time. Thus, there exists a need for a technique that overcomes the deficiencies and limitations described above.

SUMMARY OF THE INVENTION

In first embodiments, the present invention provides a method of detecting granular data store changes in a computing environment, the method comprising:

changing one or more data values of a plurality of data values stored in a first relational database including a first plurality of rows and a first plurality of columns, wherein each data value of the plurality of data values is included in a row of the first plurality of rows and in a column of the first plurality of columns;

identifying one or more rows of the first plurality of rows, the one or more rows identified as including the one or more data values changed via the changing;

propagating the one or more rows to a second relational database including a second plurality of rows and a second plurality of columns;

identifying, in the second relational database, one or more columns of the second plurality of columns, the one or more columns identified as including the one or more data values;

identifying one or more types of changes of a plurality of types of changes provided by the changing, each type of the one or more types associated with a data value of the one or more data values;

transforming at least one data value of the one or more data values included in the one or more columns into a language neutral format included in packaged data; and transforming at least one type of the one or more types into the language neutral format included in the packaged data, wherein the packaged data is to be sent in response to a client requesting the at least one data value.

In second embodiments, the present invention provides a system for detecting granular data store changes in a computing environment, the system comprising:

means for changing one or more data values of a plurality of data values stored in a first relational database including a first plurality of rows and a first plurality of columns, wherein each data value of the plurality of data values is included in a row of the first plurality of rows and in a column of the first plurality of columns;

means for identifying one or more rows of the first plurality of rows, the one or more rows identified as including the one or more data values changed via the changing;

means for propagating the one or more rows to a second relational database including a second plurality of rows and a second plurality of columns;

means for identifying, in the second relational database, one or more columns of the second plurality of columns, the one or more columns identified as including the one or more data values;

means for identifying one or more types of changes of a plurality of types of changes provided by the changing, each type of the one or more types associated with a data value of the one or more data values;

means for transforming at least one data value of the one or more data values included in the one or more columns into a language neutral format included in packaged data; and means for transforming at least one type of the one or more types into the language neutral format included in the packaged data, wherein the packaged data is to be sent in response to a client requesting the at least one data value.

In third embodiments, the present invention provides a computer program product comprising a computer-usable medium including computer-usable program code for detecting granular data store changes in a computing environment, the computer program product including:

computer-usable code for changing one or more data values of a plurality of data values stored in a first relational database including a first plurality of rows and a first plurality of columns, wherein each data value of the plurality of data values is included in a row of the first plurality of rows and in a column of the first plurality of columns;

computer-usable code for identifying one or more rows of the first plurality of rows, the one or more rows identified as including the one or more data values changed via the changing;

computer-usable code for propagating the one or more rows to a second relational database including a second plurality of rows and a second plurality of columns;

computer-usable code for identifying, in the second relational database, one or more columns of the second plurality of columns, the one or more columns identified as including the one or more data values;

computer-usable code for identifying one or more types of changes of a plurality of types of changes provided by the changing, each type of the one or more types associated with a data value of the one or more data values;

computer-usable code for transforming at least one data value of the one or more data values included in the one or more columns into a language neutral format included in packaged data; and computer-usable code for transforming at least one type of the one or more types into the language neutral format included in the packaged data, wherein the packaged data is to be sent in response to a client requesting the at least one data value.

In fourth embodiments, the present invention provides a method for deploying computing infrastructure, comprising integrating computer-readable code into a computing system, wherein the code in combination with the computing system is capable of performing a process of detecting granular data store changes in a computing environment, the process comprising:

changing one or more data values of a plurality of data values stored in a first relational database including a first plurality of rows and a first plurality of columns, wherein each data value of the plurality of data values is included in a row of the first plurality of rows and in a column of the first plurality of columns;

identifying one or more rows of the first plurality of rows, the one or more rows identified as including the one or more data values changed via the changing;

propagating the one or more rows to a second relational database including a second plurality of rows and a second plurality of columns;

identifying, in the second relational database, one or more columns of the second plurality of columns, the one or more columns identified as including the one or more data values;

identifying one or more types of changes of a plurality of types of changes provided by the changing, each type of the one or more types associated with a data value of the one or more data values;

transforming at least one data value of the one or more data values included in the one or more columns into a language neutral format included in packaged data; and transforming at least one type of the one or more types into the language neutral format included in the packaged data, wherein the packaged data is to be sent in response to a client requesting the at least one data value.

Advantageously, the present invention provides a process for detecting data store changes at the level of a column within a row of a database table. Further, the process and architecture described herein can be integrated into existing ODS solutions with minimal impact to existing infrastructure. The present invention does not require any additional products, other than the existing ODS, nor does it require any changes to existing entities within the ODS. Still further, the present invention is extendible to various business models represented in an ODS, and it can be implemented with many different technologies.

BRIEF DESCRIPTION OF THE DRAWINGS

FIG. 2 is a sequence diagram of a process of detecting granular data store changes, the process being implemented in the system of FIG. 1, in accordance with embodiments of the present invention.

FIGS. 3B-3D are tables of exemplary data to be input into the process of FIG. 2, and which exist in the source ODS of FIG. 1, in accordance with embodiments of the present invention.

FIG. 4 depicts an example of output of the process of FIG. 2, which detects data that has been inserted in the tables of FIGS. 3B-3D, in accordance with embodiments of the present invention.

FIG. 5A depicts an example of output of the process of FIG. 2, which detects updates to data in the tables of FIGS. 3B-3D, in accordance with embodiments of the present invention.

FIG. 5B depicts an example of the output of FIG. 5A modified to include data changes and omit "No Change" attributes, in accordance with embodiments of the present invention.

FIG. 5C depicts an example of the output of FIG. 5B modified to include timestamps for changes detected by the process of FIG. 2, in accordance with embodiments of the present invention.

DETAILED DESCRIPTION OF THE INVENTION

Overview

The present invention utilizes a Change Capture subsystem to implement the detection of granular data store changes. The Change Capture subsystem uses a group of components to detect changed data at a fine level of granularity, summarize data changes, transform raw data to other formats, and publish formatted data to clients or callers. As used herein, detecting a granular data store change is defined as detecting a change (i.e., an insertion, update or a deletion) in a field of a database table, where the field is identified by a particular row and a particular column of the database table. Detecting a granular data store change is more precise than detecting a change in a particular table or a particular row of that table. Hereinafter, the terms granular data store change, field level change, and column level change are used interchangeably.

As used herein, a data store is defined as one or more relational database tables that are optimized for transactional processing (i.e., data inserts, updates, and deletes, as well as read operations). A data store is different from a data warehouse in relation to their respective design paradigms. In contrast to a data store's optimization for transactional processing, a data warehouse requires a particular data layout within database tables so that read operations and queries are optimized.

As used herein, "entity" is defined as a logical representation of a thing, which when translated to a physical database implementation becomes a table or a set of tables, and which when translated to an XML implementation becomes an XML element. For example, an entity called "Customer" in a logical data store design may be implemented as a physical database table called CUST.

As used herein, "attribute" is defined as a logical representation of a characteristic of an entity. In a physical database implementation, an attribute is a logical representation of a column of a database table. In an XML implementation, an attribute is a logical representation of an XML attribute.

"Entity" and "attribute" are used herein to avoid precluding specific data model implementations relative to the present invention. References in the following description to databases and database-specific terminology pertain to only one embodiment of the present invention. Other implementations, such as a flat file implementation, are contemplated by the present invention as alternative embodiments.

Figure 1:
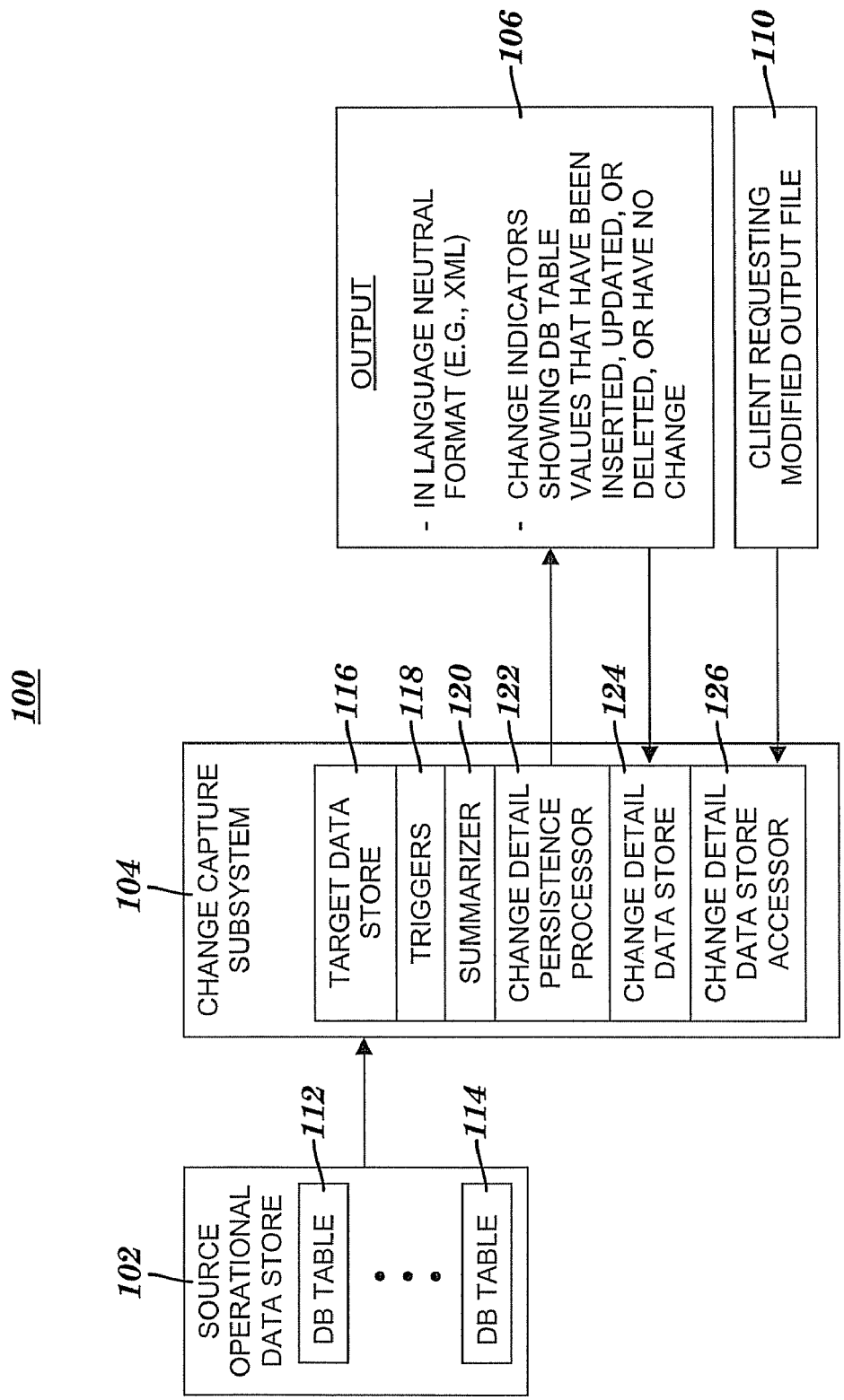
FIG. 1 is a block diagram of a system for detecting granular data store changes, in accordance with embodiments of the present invention.

FIG. 1 is a block diagram of a system for detecting data store changes at a granular level, in accordance with embodiments of the present invention. System 100 includes a source ODS 102, a Change Capture subsystem 104, an output 106 and a client 110 that requests the output 106. Source ODS 102 includes one or more relational database tables 112, 114 that include data values in rows and columns. The one or more database tables in source ODS 102 are monitored for changes by a data propagator (not shown), which is included in a relational database management system that manages source ODS 102. The data propagator senses any changes to the one or more tables included in source ODS 102, and propagates only those rows that have changed to Change Capture subsystem 104. Change Capture subsystem 104 includes the following components: a Target Data Store 116, triggers 118, a summarizer 120, a Change Detail Persistence Processor (CDPP) 122, a Change Detail Data Store (CDDS) 124, and a Change Detail Data Store Accessor (CDDSA) 126. The functionality of the components of Change Capture subsystem 104 are summarized below:

Target Data Store 116: A data store that serves as a modified clone of source ODS 102. Target Data Store 116 also contains change capture control entities (i.e., timestamp columns) to assist in identifying changes in specific entity attributes. Timestamp columns are described in detail in the section below entitled Process of Detecting Granular Data Store Changes. Target Data Store 116 stores a subset of database tables of source ODS 102, which are provided by a data propagator of source ODS 102. The data propagator performs insert, update and delete operations to the Target Data Store directly. Target Data Store 116 maintains the relationship of the data from source ODS 102 with their business keys. As used herein, a business key (a.k.a. logical business key) is a set of one or more columns within a row that uniquely identifies a row from a business point of view. A business key is distinguished from a physical key of a database in that the physical key has significance from a database perspective and not a business perspective. For example, a business key for a database table of orders is an Order number with alphanumeric characters that, in part, signify broad categories of products or services ordered; whereas a physical key for the same database table is a column of integers created and managed by a database management system.

Triggers 118: Listen for and recognize changes to tables in Target Data Store 116, determine what kind of change (i.e., insert, update or delete) has occurred in the entities, and determine which attributes in those entities have changed. For those attributes that have changed, a timestamp is associated with the attribute, and a "key trigger entry," which represents the root entity that has changed, is added to Target Data Store 116 (e.g., stored in the Root Key Entity table). A root entity is the topmost logical entity in the data store that is being monitored for changes. A key trigger entry is a logical business key of a table row that has changed. For example, if one entity is "Order" and another entity is "Order Line," which is a child of "Order," and an attribute in the "Order Line" entity changes, the root entity is "Order," and the key trigger entry is the business key for the "Order" containing the "Order Line" that has changed. Triggers 118 are invoked by any change in Target Data Store 116 resulting from data propagation from source ODS 102.

Summarizer 120: Utilizes the aforementioned Root Key Entity table to perform the following operations: (1) groups Root Key Entities by some criteria; (2) passes Root Key Entities through a Data Filter component (not shown) of Change Capture subsystem 104 to identify data eligible for change capture (i.e., the "summarized" Root Key Entities); and (3) invokes CDPP 122, passing it the "summarized" Root Key Entities. Summarizer 120 can be implemented by, for example, a SQL stored procedure. Although the Triggers 118 component can perform the three operations listed above instead of Summarizer 120, usage of Summarizer 120 is preferred to avoid bottlenecking the Triggers 118 component.

Change Detail Persistence Processor 122: For data that has been identified as changed, CDPP 122 packages data associated with the summarized Root Key Entities in a language neutral format (e.g., eXtensible Markup Language (XML)), which can be utilized by CDDSA 126. As used herein, a language neutral format is defined as a format that is not dependent upon a particular programming language, and can be read by any software application without requiring a specific compiler, parser, API, etc. The packaged data includes changed data (i.e., packaged change data), as well as business keys, entitlement values, and change capture control values. As used herein, an entitlement value is a set of fields that match changed data values in the database with the data values' intended recipients (see Audience/Entitlement Data Store described below). As used herein, a change capture control value (a.k.a. change indicator) is a value in the packaged data that identifies the type of change associated with a changed data value in the Target Data Store (e.g., a "U" change indicator indicates an update). CDPP 122 also saves the packaged change data to CDDS 124 as character strings (e.g., in XML format). CDPP 122 can be implemented by, for example, a SQL stored procedure using SQL/XML for packaging.

Change Detail Data Store 124: Provides a storage mechanism for the packaged data to persist, until CDDSA 126 queries and consumes the packaged change detail data. The packaged change detail data contains the logical business keys, entitlement values and change capture control values. CDDS 124 supports association of changed data to logical entities in Target Data Store 116. Further, CDDS 124 supports storage of change capture data in which data has been packaged and is ready for release to CDDSA 126.

Change Detail Data Store Accessor 126: An interface that allows restricted access to data in CDDS 124. CDDSA 126 marks changed data as "consumed" in response to the changed data being sent to interface callers. The aforementioned restricted access ensures that once a client or caller uses CDDSA 126 to retrieve a change detail package, CDDSA 126 (1) queries CDDS 124; (2) obtains the packaged character string data; (3) passes the packaged data to the client or caller; and (4) deletes the packaged data from CDDS 124 so that the packaged data cannot be consumed more than once. CDDSA 126 can be implemented by, for example, stored procedures.

Audience/Entitlement Data Store (not shown in FIG. 1): Stores appropriate audience/entitlement values and their mapped relationships, which allow matching changed data to a single logical audience member. Although this component is optional, it is useful in filtering changed data to a restricted set of users.

CDPP 122 of Change Capture subsystem 104 produces output 106 in a language neutral format (e.g., an XML document). The output 106 includes packaged change detail data, which is stored in CDDS 124 as a data object type which supports the language neutral output. The packaged change detail data includes indicators showing data values in database tables 112, 114 that have been inserted, updated or deleted, or have had no change. In one embodiment, output 106 includes the insert, update and delete indicators, but one or more "no change" indicators are deleted. In another embodiment, output 106 includes timestamps that indicate a date and time when each change to a column occurred. The various combinations of the aforementioned outputs are also contemplated by the present invention. After CDDS 124 stores the packaged change detail data, a client 110 that requested the output consumes the packaged change detail data.

Process of Detecting Granular Data Store Changes

FIG. 2 is a sequence diagram of a process of detecting granular data store changes, the process being implemented in the system of FIG. 1, in accordance with embodiments of the present invention. Sequence diagram 200 includes components of Change Capture subsystem 104 (see FIG. 1):

Source ODS 102, Target Data Store 116, Triggers 118, Summarizer 120, CDPP 122, an Audience/Entitlement Data Store 212, CDDS 124, CDDSA 126 and an Interface Caller 218. Each component in FIG. 2 has an associated rectangular bar that appears below the component. Each rectangular bar represents a life span of its associated component. That is, for each component, the associated bar represents the time period during which that component is running, and during which data managed by that component is accessible. For the components that are data stores (e.g., source operational data store 102), the associated bars extend throughout the entire time period covered by FIG. 2 (i.e., the entire vertical distance of the sequence diagram), thereby illustrating that the data store components are always running and their data is persistent.

The process of detecting data store changes at a column level begins with one or more changes to data values in source ODS 102. As used herein, a data value in a data store is synonymous with a value of a field of the data store, and is also referred to as a field value. In step 220, a data propagator feature of a database management system managing source ODS 102 detects the data value changes that occur in one or more database tables and rows of source ODS 102, and propagates the changed table(s) and row(s) from source ODS 102 to Target Data Store 116. The data value change can be the result of an insert, update or delete operation. The data propagator also sends to Target Data Store 116 the type of operation (i.e., insert, update or delete) associated with the changed table(s) and row(s). The data propagator does not have the ability to detect a particular column that has changed within a given changed row.

Data propagation in step 220 occurs repeatedly at pre-defined time intervals. If one database field value is changed multiple times in the pre-defined interval, only the most recent change is processed by the remaining steps of FIG. 2.

Triggers 118 listen for insert, update and delete operations on data in Target Data Store 116 that has been propagated from source ODS 102. In step 222, one of the Triggers 118 detects a change at a column level and, in step 224, updates a timestamp column in Target Data Store 116 that indicates the date and time that the column changed. In step 222, Triggers 118 also add a business key of the root entity that has changed to the Root Key Entity table.

In one embodiment, a plurality of triggers are programmed so that each trigger detects changes in one of a plurality of columns included in Target Data Store 116, and updates a timestamp column accordingly. For example, if Target Data Store 116 included a table with 10 columns corresponding to 10 columns of source ODS 102, then 10 triggers are programmed where trigger 1 is programmed to detect changes in column 1, trigger 2 is programmed to detect changes in column 2, etc. Target Data Store 116 also includes additional timestamp columns (i.e., one additional timestamp column for each column corresponding to source ODS 102 which is being monitored for changes). Continuing the example above with 10 triggers, Target Data Store 116 includes columns 1-10 to correspond to the 10 columns in source ODS 102, and also includes timestamp columns 11-20, where timestamp column 11 stores the date and time of a change to column 1, column 12 stores the date and time for a change to column 2, etc.

In cases where Triggers 118 detect a row deletion, an additional step takes place. Before the table row is deleted, a Trigger saves all the row's field values to a "Deletion" table. The row is deleted from the Target Data Store 116, but remains in the "Deletion" table. The "Deletion" table for the row is used later in CDPP 122 to represent rows that have been physically deleted from Target Data Store 116.

In one embodiment, Target Data Store 116 includes the timestamp columns as described above, and also includes one additional timestamp column (a.k.a. row-level timestamp) that stores the date and time for the insertion, update or deletion of each row.

For each row that has changed in Target Data Store 116, Triggers 118 compile a list with references (a.k.a. pointers) to all rows that have been inserted, updated or deleted. This list is also known as a root entity list. For instance, for changes in a table with orders, Triggers 118 keep a list with order numbers that identify the rows of the order table that have changed. The list managed by Triggers 118 is stored, for example, in KeyTriggerTable. In step 226, Summarizer 120 requests and receives the Root Key Entity list compiled by the Triggers. Summarizer 120 performs, in step 228, a lookup of entitlement values in Audience/Entitlement Data Store 212 to further filter the changed data of Target Data Store 116. That is, Summarizer 120 invokes Audience/Entitlement Data Store 212 to request a list of the audience or "universe" of relevant recipients of changed data (i.e., entities that are entitled to receive output from the process of FIG. 2). Audience/Entitlement Data Store 212 stores entitlement values (e.g., Customer number) and their mapped relationships that allow system 100 (see FIG. 1) to match one or more business entities to each audience member. In step 230, the list of recipients requested in step 228 is sent from Audience/Entitlement Data Store 212 to Summarizer 120. For example, the KeyTriggerTable includes change information for ten different customers A through J, but only customers A, B and C are entitled to receive that information. In this example, step 228 requests from Audience/Entitlement Data Store 212 the list of customers entitled to receive changed data, and step 230 returns a list of customers A, B and C to Summarizer 120.

Using the audience/entitlement list in step 232, Summarizer 120 groups root key entities by some criteria (e.g. audience/entitlement or some other business criteria), and passes root key entities through a Data Filter component (not shown) to generate a summarized Root Key Entity list. The summarized Root Key Entity list is stored in Target Data Store 116 for CDPP 122 to use as the list for generating the packaged data. Step 234 is a "return control" loop back to Summarizer 120.

After filtering out data from the Root Entity Key list so that only root entity keys associated with the list of entitled recipients sent in step 230 remain in the Root Entity Key list, Summarizer 120 invokes CDPP 122 in step 236. In step 238, CDPP 122 requests the filtered and summarized Root Entity Key list from Target Data Store 116. CDPP 122 uses the filtered Root Entity Key list, which includes logical business keys, to query Target Data Store 116 to obtain the full view of an entity whose business key is in the list. CDPP 122 queries Target Data Store 116 to obtain all the information regarding entities, attributes and control values that the CDPP needs to package the data into language neutral format. For example, if the Root Entity Key list includes an order number business key (e.g., Order #1234567), the CDPP uses this business key to query attribute information associated with this business key (e.g., an order date, order line items, quantities, prices, etc.). In step 240, the filtered Root Entity Key list and the entities, attributes, and control values queried in step 238 are passed from Target Data Store 116 to CDPP 122.

Steps 238 and 240 are repeated for each root entity that has changed. For example, CDPP 122 obtains a list of pointers to three changed orders having order numbers 123, 456 and 789. In this example, CDPP 122 requests and receives from Target Data Store 116 order numbers 123, 456 and 789, and all of their attributes, such as all of the order lines, schedules, and customer data associated with order numbers 123, 456 and 789.

CDPP 122 packages the changed data and associated attributes from steps 238 and 240 into a language neutral format, such as XML. CDPP 122 includes timestamps in the changed data and attributes packaged in language neutral format. Moreover, CDPP 122 performs comparisons with timestamp columns of Target Data Store 116 to determine whether each column has changed, and for those columns that have changed, whether each changed column in a given row is an insertion, an update or a deletion. Depending on the type of change, indicators of an insert, update or delete for each changed column are added to the packaged changed data by CDPP 122. For those columns that have not changed, a "no change" indicator is added.

An update of a column is indicated by the aforementioned timestamp comparisons if a column timestamp in a single row is different from all other column timestamps of the same row. As an example of an update, consider Target Data Store 116 including order data in columns 1-10 and timestamps corresponding to columns 1-10 in columns 11-20, respectively, where column 5 is the order price and column 15 is the timestamp of the order price. In this example, if the timestamps in columns 11-14 and columns 16-20 for a given order are all identical with a date of three months ago, and the timestamp in column 15 for the same order is a date of only two minutes ago, then the difference between the column 15 timestamp compared to other timestamps for the same order indicates that the price in column 5 for that order is an updated price.

An insertion of a row is indicated when the aforementioned timestamp comparisons performed by CDPP 122 determines that the individual column timestamp columns and the row-level timestamp are all equal. For instance, consider Target Data Store 116 having data columns 1-10 and corresponding timestamp columns 11-20, and also including column 21, which is a row-level timestamp column. In this example, an insertion of a complete row X that includes values for columns 1-10 is indicated if columns 11-20 all include the same timestamp Y, and column 21, which is the timestamp for the insertion of row X, also includes timestamp Y. In this case, each column of row X is designated as being changed by an insertion.

A deletion of a row fires a Trigger that performs the following actions before the row is physically deleted from Target Data Store 204: (1) inserts the root entity for the row being deleted into the Root Entity Key table and marks the root entity as a deleted entity (e.g., marks it with a "D" in an Operand column); (2) inserts the data from the row being deleted into a Deletion table; and (3) sets a deletion timestamp in the Deletion table. The Deletion table is a copy of the physical database table from which the row has been deleted, except that it has an extra column for the deletion timestamp to record when the row was deleted. After the Trigger completes recording the deletion, the row is physically deleted from the Target Data Store table. CDPP 122 uses the designation of a deleted entity in the Root Entity Key table (e.g., the "D" marked in the Operand column) to set all change indicators for the entity as "Delete" indicators.

Returning to sequence diagram 200, after CDPP 122 has the change data packaged, the CDPP saves the packaged change data to persistent storage (i.e., CDDS 124) in step 242. CDDS 124 acts as the "release area" for the packaged change data. All packaged change data remains in CDDS 124 until it is consumed by interface caller 218 via step 244. In step 244, interface caller 218 requests changed data from CDDSA 126, which acts as a "gatekeeper" to CDDS 124. In response to the interface caller request of step 244, CDDSA 126 requests the changed data from CDDS 124 in step 246. In step 248, the data requested in step 246 is returned to CDDSA 126 from CDDS 124. In step 250, the changed data is sent from CDDSA 126 to interface caller 218.

CDDSA 126 functionality also includes ensuring that the data in CDDS 124 is consistent (i.e., no dirty reads or phantom updates). Further, the CDDSA allows packaged change data to be consumed by the interface caller exactly once. Moreover, the CDDSA performs logging, which records the interaction between interface caller 218 and Change Capture subsystem 104 (see FIG. 1).

EXAMPLE

Figure 3A:
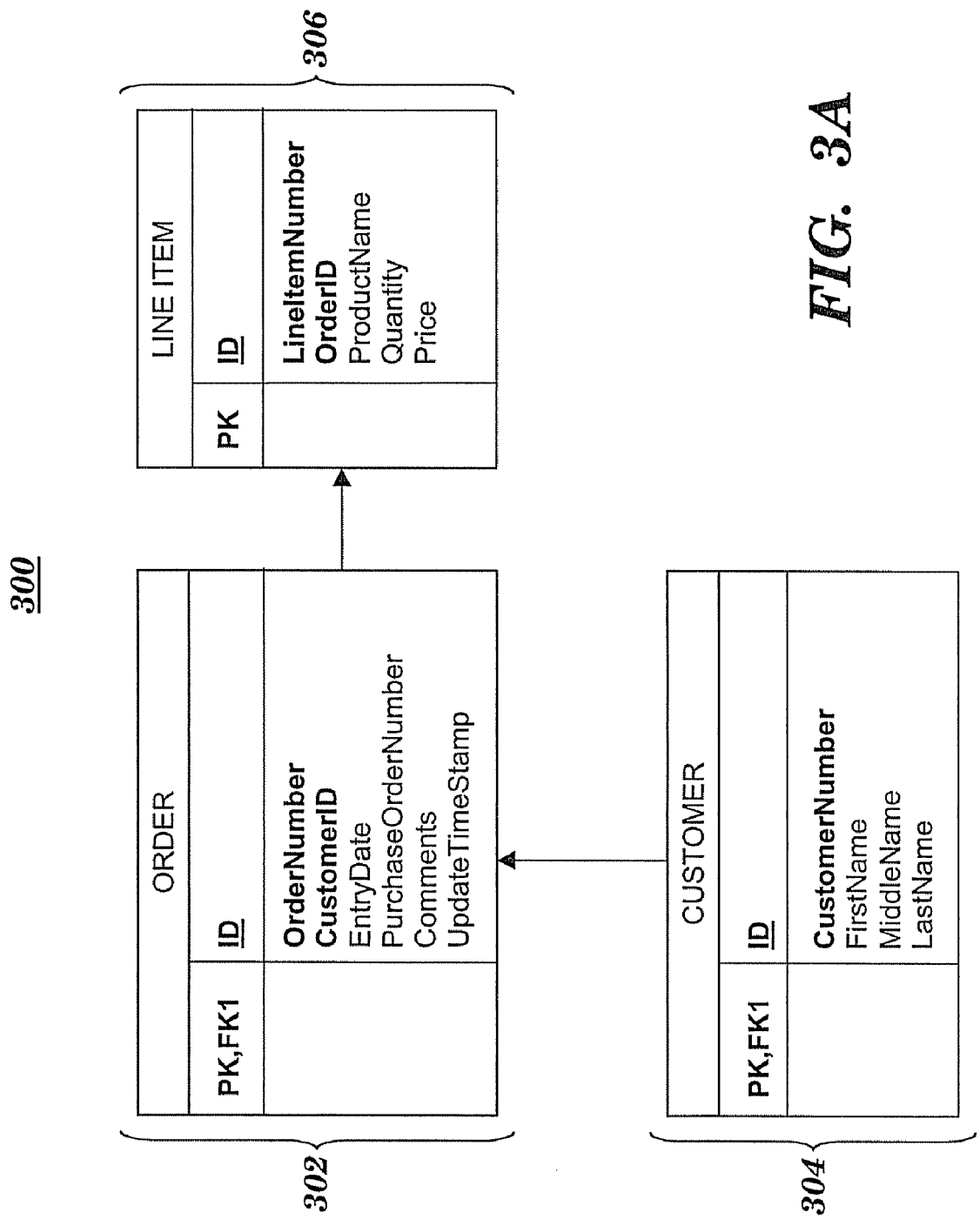
FIG. 3A depicts exemplary entity structures in a source ODS in which changes are to be detected by the process of FIG. 2, in accordance with embodiments of the present invention.

FIGS. 3A-3D, 4, and 5A-5C depict an example of input and output associated with the change capture process of FIG. 2. FIG. 3A depicts exemplary entity structures 300 in source ODS 102 (see FIG. 1) in which changes are to be detected by the process of FIG. 2, in accordance with embodiments of the present invention. Entity structures 300 include an order structure 302, a customer structure 304, and a line item structure 306. Order structure 302 is the structure of a database table (i.e., Order table) in source ODS 102 (see FIG. 1) that stores data related to customer orders. The Order table includes an ID key field, an order number, a customer ID, an entry date for the order, a purchase order (PO) number, comments, and a timestamp associated with an update of the order. Customer structure 304 is the structure of a database table (i.e., Customer table) in source ODS 102 (see FIG. 1) that stores data related to the customers placing the orders in the Order table. The Customer table fields include an ID key field, a customer number, and first, middle and last names. Line item structure 306 is the structure of a database table (i.e., Line Item table) in source ODS 102 (see FIG. 1) that stores line item information related to the orders of the Order table. The Line Item table fields include an ID key field, a line item number, an order ID, a product name, a quantity and a price.

FIGS. 3B-3D are database tables of exemplary data to be input into the process of FIG. 2, and which exist in the source ODS 102 (see FIG. 1), in accordance with embodiments of the present invention. Order database table 330 in FIG. 3B is a table of data associated with orders, where each row corresponds to an order, and each column is labeled according to order structure 302 (see FIG. 3A). Customer database table 350 in FIG. 3C is a table of data associated with customers who placed the orders in table 330 (see FIG. 3B). Each row of table 350 corresponds to a customer, and each column is labeled according to customer structure 304 (see FIG. 3A). Line Item database table 370 in FIG. 3D is a table of data associated with line items of the orders of table 330 (see FIG. 3B). Each row of table 370 is a line item of an order of order database table 330 (see FIG. 3B), and each column is labeled according to line item structure 306 (see FIG. 3A). The data in tables 330, 350 and 370 in FIGS. 3B, 3C and 3D, respectively, are utilized as input to the change capture process of FIG. 2 (e.g., as the source data propagated in step 220 of FIG. 2).

FIG. 4 depicts an example of output of the process of FIG. 2 which detects data that has been inserted in the tables of FIGS. 3B-3D, in accordance with embodiments of the present invention. Output 400 is an XML document output by CDDSA 126 (see FIGS. 1 and 2), at step 250 of the process of FIG. 2. Output 400 includes changeIndicator="I" on various lines, which are indicators of newly inserted values into fields of one or more of the database tables of FIGS. 3B-3D. For instance, the 18th line of output 400 is <quantity changeIndicator="I">25</quantity>, which indicates that a quantity of 25 has been inserted into a database table. In this case, the quantity is associated with line item number 1000000001, and is inserted into Line Item table 370 of FIG. 3D.

As is seen in FIG. 4, the structure of the output from CDDSA (see FIGS. 1 and 2) need not conform exactly to the layout of the source ODS entity structures 300 (see FIG. 3A). For instance, output from the CDDSA can be formatted in XML, comma-delimited format, fixed record length, or other desired formats.

In the FIG. 4 example, the "I" change indicators, which stand for "Insert," indicate entities and attributes that are newly inserted into Target Data Store 116 (see FIGS. 1 and 2) (i.e., inserted within the pre-defined time interval for the above-described data propagation). Other valid values for the change indicator are "U" for Update, "D" for Delete, and "N" for No Change. Relative to data in the source ODS, "U" indicates that an associated field value has been updated in the pre-defined time interval, "D" indicates that an associated field value has been deleted in the pre-defined time interval, and "N" indicates that an associated field value has not changed within the pre-defined time interval.

FIG. 5A depicts an example of output of the process of FIG. 2, which detects updates to data in the tables of FIGS. 3B-3D, in accordance with embodiments of the present invention. Output 500 is an XML document output by CDDSA 126 (see FIGS. 1 and 2), at step 250 of the process of FIG. 2. Output 500 includes changeIndicator="U" on various lines to indicate updated fields in source ODS 102 (see FIG. 1). For example, the 18th line is <quantity changeIndicator="U">100</quantity>, which indicates that a quantity of 100 is an updated field value (i.e., a value that replaced the quantity of 25 shown in the quantity column of the first data row of Line Item table 370 in FIG. 3D). Various other lines of output 500 include a change indicator of "N" to designate field values that have not changed (e.g., the product name of "xSeries 5474" shown in the 17th line of output 500).

The output of CDPP 122 (see FIGS. 1 and 2) can be modified to include the field values that have changed (i.e., values that have been inserted, updated or deleted), and omit one or more of the attributes identified by a "No Change" (i.e., "N") indicator. Any attribute with an "N" change indicator is retained in the modified output if it is a business key needed to identify a path to a field value that has been inserted, updated or deleted; all other attributes with "N" change indicators are omitted from the output. By omitting these "No change" attributes, the overhead of sending data to interface caller 218 (see FIG. 2) is greatly reduced.

FIG. 5B depicts an example of the output of FIG. 5A modified to include data changes and omit one or more of the "No Change" attributes of FIG. 5A, as described above. Output 520 depicts strikethroughs across certain lines with "N" change indicators to indicate which lines present in output 500 (see FIG. 5A) are omitted when generating the modified XML document of FIG. 5B. For instance, the 17th line of output 500 (see FIG. 5A), which includes the product name of xSeries 5474, and is described above, is deleted in output 520 because it has a "N" change indicator, and is not needed to identify a path to changed data. Other lines, such as the 5th line that includes an order number, is retained in output 520, even though it has an "N" change indicator, because it is needed to identify a path to the line items quantity and price, which have been updated.

Timestamps can be included to further modify the output of CDPP 122 (see FIGS. 1 and 2). These timestamps indicate the date and time when an insert, update or delete of a field in source ODS 102 (see FIG. 1) was propagated to Target Data Store 116 (see FIGS. 1 and 2). FIG. 5C depicts an example of the XML document of FIG. 5B modified to include timestamps for changes detected by the process of FIG. 2, in accordance with embodiments of the present invention. Output 540 is an XML document that includes lines with timestamp indicators in the format updateTimeStamp="yyyy-mm-dd hh:mm:ss.ssssss" where yyyy is a four-digit year, mm is a two-digit month, dd is a two-digit day, and hh:mm:ss.ssssss is a time in a 24-hour clock system. In the time portion of the format, hh is a two-digit hour, mm is a two-digit minute, and ss.ssssss indicates the seconds in a two-digit integer followed by six decimal places. For example, the line of output 540 that starts with <quantity changeIndicator="U" includes the timestamp updateTimeStamp="2004-01-15 21:23:02.392749", which indicates that the quantity for line item number 1000000001 was updated to 100 on Jan. 15, 2004 at a time of 21:23:02.392749. It should be noted that the above timestamp format is only an example, and the present invention contemplates other formats for the date and/or time.

The different formatting options for output shown in FIGS. 5A, 5B, and 5C are isolated in CDPP 122 (see FIGS. 1 and 2). Once the output is generated, CDDS 124 (see FIGS. 1 and 2) is used as a repository to allow interface callers to retrieve the output.

Computing System

Figure 6:
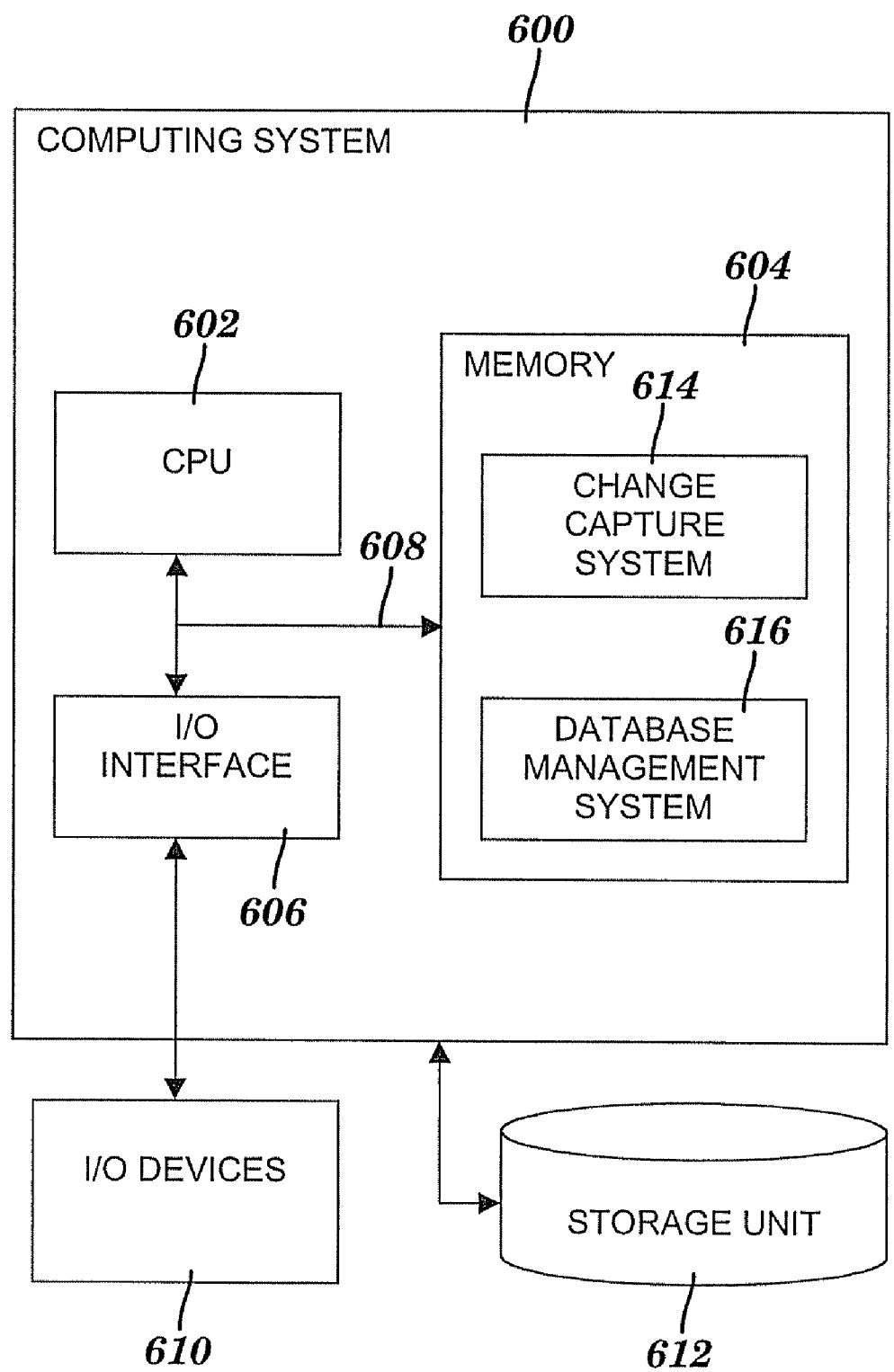
FIG. 6 is a block diagram of a computing system implementing the process of FIG. 2, in accordance with embodiments of the present invention.

FIG. 6 is a block diagram of a computing system implementing the process of FIG. 2, in accordance with embodiments of the present invention. Computing system 600 generally comprises a central processing unit (CPU) 602, a memory 604, an input/output (I/O) interface 606, a bus 608, I/O devices 610 and a storage unit 612. CPU 602 performs computation and control functions of computing system 600. CPU 602 may comprise a single processing unit, or be distributed across one or more processing units in one or more locations (e.g., on a client and server). Memory 604 may comprise any known type of data storage and/or transmission media, including magnetic media, optical media, random access memory (RAM), read-only memory (ROM), a data cache, a data object, etc. Moreover, similar to CPU 602, memory 604 may reside at a single physical location, comprising one or more types of data storage, or be distributed across a plurality of physical systems in various forms. Further, memory 604 can include data distributed across, for example, a LAN, WAN or storage area network (SAN) (not shown).

Storage unit 612 is, for example, a magnetic disk drive or an optical disk drive. Source ODS 102 (see FIG. 1), Target Data Store 116 (see FIG. 1), Change Detail Data Store 124 (see FIG. 1), and Audience/Entitlement Data Store 212 (see FIG. 2) are stored in storage unit 612. Alternatively, some or all of the data stores of the change capture system may be stored in other storage units (not shown), which may be connected to computing system 600 or to one or more other computing systems (not shown). If a plurality of computing systems is utilized, they are in communication with each other via a network. For example, the source ODS may reside in a storage unit of a first computing system, while the Target Data Store, Change Detail Data Store and the Audience/Entitlement Data Store may be stored in a second computing system. In this example, the data propagator sends data via a network from the source ODS on one machine to the Target Data Store on another machine.

I/O interface 606 comprises any system for exchanging information to or from an external source. I/O devices 610 comprise any known type of external device, including a display monitor, keyboard, mouse, printer, speakers, handheld device, printer, facsimile, etc. Bus 608 provides a communication link between each of the components in computing system 600, and may comprise any type of transmission link, including electrical, optical, wireless, etc.

I/O interface 606 also allows computing system 600 to store and retrieve information (e.g., program instructions or data) from an auxiliary storage device, such as a non-volatile storage device (e.g., a CD-ROM drive which receives a CD-ROM disk) (not shown). Computing system 600 can store and retrieve information from other auxiliary storage devices (not shown), which can include a direct access storage device (DASD) (e.g., hard disk or floppy diskette), a magneto-optical disk drive, a tape drive, or a wireless communication device.

Memory 604 includes computer program code comprising a change capture system 614 including program code that implements the process of FIG. 2, and a relational database management system (RDBMS) 616. Data from relational database tables 112, 114 (see FIG. 1) is input into the process of FIG. 2, and is managed by RDBMS 616. RDBMS 616 includes a data propagation feature to provide the data propagation step 220 of FIG. 2. RDBMS 616 is, for example, DB2® or Oracle. Further, memory 604 may include other systems not shown in FIG. 6, such as an operating system (e.g., Linux) that runs on CPU 602 and provides control of various components within and/or connected to computing system 600.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 614 for use by or in connection with a computing system 600 or any instruction execution system to provide and facilitate the capabilities of the present invention. For the purposes of this description, a computer-usable or computer-readable medium can be any apparatus that can contain, store, the program for use by or in connection with the instruction execution system, apparatus, or device.

Examples of a computer-readable medium include a semiconductor or solid state memory, magnetic tape, a removable computer diskette, RAM, ROM, a rigid magnetic disk and an optical disk. Current examples of optical disks include compact disk-read-only memory (CD-ROM), compact disk-read/write (CD-R/W) and DVD.

A computing system 600 suitable for storing and/or executing program code 614 includes at least one processor 602 coupled directly or indirectly to memory elements 604 through a system bus 608. The memory elements can include local memory employed during actual execution of the program code, bulk storage, and cache memories which provide temporary storage of at least some program code in order to reduce the number of times code must be retrieved from bulk storage during execution.

Furthermore, the present invention discloses a method for deploying or integrating computing infrastructure, comprising integrating computer-readable code into computer system 600, wherein the code in combination with computer system 600 is capable of detecting data store changes at a granular level. The disclosed method for deploying or integrating computing infrastructure with the capabilities described herein can be offered as a service on a subscription service.

The sequence diagrams or flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A system of detecting granular data store changes in a computing environment, comprising:

a processor; and a memory coupled to the processor; the system further comprising:

means for changing one or more data values of a plurality of data values stored in a first relational database including a first plurality of rows and a first plurality of columns, wherein said one or more data values includes a data value included in a row of said first plurality of rows and in a column of said first plurality of columns;

means for identifying one or more rows of said first plurality of rows, said one or more rows identified as including said one or more data values changed via said changing;

means for propagating said one or more rows to a second relational database including a second plurality of rows and a second plurality of columns, wherein said means for propagating said one or more rows includes means for propagating said row to a target row of said second relational database, wherein said second plurality of columns includes a first set of columns and a second set of columns, wherein a first result of said propagating said row is that said first set of columns includes a first set of data values included in said target row, wherein said first set of data values includes said data value, wherein a second result of said propagating said row is that said second set of columns includes a set of timestamps associated with data values of said first set of data values in a one-to-one correspondence, wherein each timestamp of said set of timestamps indicates a time of an insertion of a corresponding data value of said first set of data values or a time of an update of a corresponding data value of said first set of data values, wherein a column of said second set of columns includes a timestamp of said set of timestamps that indicates a time of an insertion of said data value into said second relational database prior to said changing;

means for updating said timestamp to a time of an update of said data value, wherein said update is a result of said changing;

means for transforming at least one data value of said one or more data values included in said one or more columns into packaged data expressed in a language neutral format, wherein said at least one data value includes said update of said data value;

means for detecting, subsequent to said updating said timestamp, that said timestamp is different from any other timestamp of said set of timestamps; and means for inserting an indicator of said update into said packaged data in response to said detecting that said timestamp is different from any other timestamp of said set of timestamps.

2. The system of claim 1, further comprising:

means for generating a table of one or more pointers referencing one or more rows of said second plurality of rows, said one or more rows of said second plurality of rows including said one or more data values; and means for filtering out at least one row of said one or more rows of said second plurality of rows to generate a set of one or more rows including said at least one data value, wherein said filtering is based on pre-defined criteria.

3. The system of claim 1, wherein said means for transforming comprises:

means for identifying an unchanged data value of said plurality of data values as being unchanged by said changing; and means for tagging, in said packaged data, said unchanged data value with an indicator that indicates that said unchanged data value is not changed in a pre-defined time interval during which said changing is performed.

4. The system of claim 3, further comprising:

means for sending, to a client requesting said at least one data value, said at least one data value in said language neutral format without including said unchanged data value; and means for sending, to said client, said indicator of said update in said language neutral format.

5. The system of claim 1, wherein said language neutral format is an XML format.

6. A computer program product comprising a computer-usable medium including computer-usable program code for detecting granular data store changes in a computing environment, the computer program product including:

computer-usable code for changing one or more data values of a plurality of data values stored in a first relational database including a first plurality of rows and a first plurality of columns, wherein said one or more data values includes a data value included in a row of said first plurality of rows and in a column of said first plurality of columns;

computer-usable code for identifying one or more rows of said first plurality of rows, said one or more rows identified as including said one or more data values changed via said changing;

computer-usable code for propagating said one or more rows to a second relational database including a second plurality of rows and a second plurality of columns, wherein said propagating said one or more rows includes propagating said row to a target row of said second relational database, wherein said second plurality of columns includes a first set of columns and a second set of columns, wherein a first result of said propagating said row is that said first set of columns includes a first set of data values included in said target row, wherein said first set of data values includes said data value, wherein a second result of said propagating said row is that said second set of columns includes a set of timestamps associated with data values of said first set of data values in a one-to-one correspondence, wherein each timestamp of said set of timestamps indicates a time of an insertion of a corresponding data value of said first set of data values or a time of an update of a corresponding data value of said first set of data values, wherein a column of said second set of columns includes a timestamp of said set of timestamps that indicates a time of an insertion of said data value into said second relational database prior to said changing;

computer-usable code for updating, subsequent to said propagating, said timestamp to a time of an update of said data value, wherein said update is a result of said changing;

computer-usable code for transforming at least one data value of said one or more data values included in said one or more columns into packaged data expressed in a language neutral format, wherein said at least one data value includes said update of said data value;

computer-usable code for detecting, subsequent to said updating said timestamp, that said timestamp is different from any other timestamp of said set of timestamps; and computer-usable code for inserting an indicator of said update into said packaged data in response to said detecting that said timestamp is different from any other timestamp of said set of timestamps.

7. The program product of claim 6, further comprising:

computer-usable code for generating a table of one or more pointers referencing one or more rows of said second plurality of rows, said one or more rows of said second plurality of rows including said one or more data values; and computer-usable code for filtering out at least one row of said one or more rows of said second plurality of rows to generate a set of one or more rows including said at least one data value, wherein said filtering is based on pre-defined criteria.

8. The program product of claim 6, wherein said computer-usable code for transforming comprises:

computer-usable code for identifying an unchanged data value of said plurality of data values as being unchanged by said changing; and computer-usable code for tagging, in said packaged data, said unchanged data value with an indicator that indicates that said unchanged data value is not changed in a pre-defined time interval during which said changing is performed.

* * * * *